UNITED STATES PATENT OFFICE.

ABBEY S. SMITH, OF ROCHESTER, NEW YORK.

SCALE FOR INSTRUMENTAL MUSIC.

Specification of Letters Patent No. 15,937, dated October 21, 1856.

*To all whom it may concern:*

Be it known that I, ABBEY S. SMITH, of the city of Rochester, county of Monroe, and State of New York, have invented a new and useful improvement of the letter organization of the instrumental music scale for facilitating the reading thereof by the learner and to aid the teacher also by diminishing the labor; and I do hereby declare that the following is an exact description thereof, reference being had to the accompanying specimens and to the figures of reference marked thereon.

The nature of my invention consists in originating and giving form to two new representatives of the two unrepresented keys of each of the seven adopted musical letters, each of these letters having three keys and heretofore but one key of each letter represented or expressed, the other two being decided by signatures placed at the commencement of the tune or strain and necessarily carried in the mind or memory through the same by the pupil to be able to produce the desired tone or key, each of the three keys being positive distinct and unvarying. A, natural being the same identical sound or key the musically educated world over, A, sharp, another definite key the world over, and, A, flat, another definite key or sound the world over, and the same of the remaining six letters. Unlike the organization of the do, ra, me, fa, sol, la, si, or any names or device expressive of the same organization as used by the vocalist as neither of these have any definite key or sound but may any and all be used to any key or sound so as to accommodate the speaking of the sound and of course wholly unavailable to the use of the instrument, and also in the arrangement of the three representatives with other musical characters upon the staff or scale so that no encroachment is made upon any one, but all and each retain their full value capacity and position notwithstanding this arrangement, thus bringing to the eye at a glance these representatives as submitted.

To enable others skilled in the art to use my improvement I will proceed to describe it.

As the seven musical letters representing the keys natural, of which five are whole, and two are half tones or semitones, as used in the musical grammar or gamut are of an upright form as, at specimen, No. 1, Figures 2, and 3. For representatives of each of these seven letters A, B, C, D, E, F, G sharp key I use each of these seven letters in form inclining to the right hand, that is, italics, or varying from the natural or upright letters so much that the difference may be plainly observed at a glance, as at Figs. 4 and 5 of the same specimen. For representatives of these musical letters flat key I use these same named but in form italics inclining to the left hand, or varying from those which represent the keys natural, and the keys sharp, so as to be readily distinguished at sight without reference to preceding signatures as at Figs. 6 and 7. These representatives I use in the musical grammar or gamut alone as dictators upon the staff as at specimen No. 1 to which I have been referring, and also in special and particular arrangement with any and all other musical characters upon the staff, not for or in place of any other or to show the value of any other character, but in their own defined capacity of letter keys for the use of the instrument without mathematical calculation using them in such arrangement that no interference with, or encroachment upon, any other character or the capacity of any other character is affected, or the laws of the established letter system (which makes these letters dependent upon the particular lines and spaces they occupy upon the staff for their musical character) disarranged as at specimens Nos. 2, 3 and 4. The light and dark face of each note being undisturbed as at specimen, No. 5, giving to each letter key as used by the instrument a tangible form upon the face of the music so the learner is able to read without mathematical calculation and without carrying in the mind the preceding signatures the teacher greatly aided by the lessons being rendered simple and easy.

I do not claim the use of letters to denote musical sounds.

What I claim as my invention and desire to secure by Letters Patent is—

An improvement of the established letter organization of the instrumental music scale by originating and giving tangible form and shape to a character to be called and to denote sharp key, A, and another flat key, A, and another sharp key B another flat key B, another sharp key C and another flat key C, and the same of sharp and flat keys D E F and G for which characters I claim different specific forms or shapes of each of the seven adopted musical letters and different from the adopted shape of the adopted letters all of which I arrange with other musical characters upon the staff so that all retain their value capacity and position in perfect conformity to the organic law thereof and the different keys in their definite capacity are in form brought to sight to be read at a glance of the eye by teacher and learner as herein described and set forth, or in any way substantially the same.

ABBEY S. SMITH.

Witnesses:
 CHARLES HALL,
 A. K. AMSDEN.